United States Patent [19]

Garwood et al.

[11] Patent Number: 5,399,368
[45] Date of Patent: Mar. 21, 1995

[54] ENCAPSULATION OF VOLATILE AROMA COMPOUNDS

[75] Inventors: Robert E. Garwood, Bellefontaine; Zenon I. Mandralis, Dublin; Scott A. Westfall, Marysville, all of Ohio

[73] Assignee: Nestec S.A., Vevey, Switzerland

[21] Appl. No.: 300,777

[22] Filed: Sep. 6, 1994

[51] Int. Cl.⁶ .................... A23F 5/46; A23L 1/221
[52] U.S. Cl. ...................... 426/307; 426/96; 426/98; 426/594; 426/597; 426/650; 426/651
[58] Field of Search ............... 426/96, 98, 594, 650, 426/651, 307, 597

[56] References Cited

U.S. PATENT DOCUMENTS

| | | | |
|---|---|---|---|
| 2,856,291 | 10/1958 | Schultz . | |
| 3,012,893 | 12/1961 | Kremzner et al. | 426/572 |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,241,092 | 12/1980 | Halik et al. | 426/572 X |
| 4,520,033 | 5/1985 | Tuot | 426/96 |
| 4,576,826 | 3/1986 | Liu et al. | 426/289 |
| 4,634,598 | 1/1987 | Liu et al. | 426/650 |
| 4,820,543 | 4/1989 | Osawa | 426/653 |
| 4,919,962 | 4/1990 | Arora et al. | 426/594 |
| 5,035,908 | 7/1991 | Arora et al. | 426/594 X |
| 5,079,026 | 1/1992 | Arora et al. | 426/594 |
| 5,110,276 | 5/1992 | Farnsworth et al. | 425/133.1 |
| 5,229,153 | 7/1993 | Blanc | 426/386 |
| 5,236,729 | 8/1993 | Schlect et al. | 426/417 |

FOREIGN PATENT DOCUMENTS 0158460 10/1985 European Pat. Off. .

Primary Examiner—Joseph Golian

[57] ABSTRACT

A method of encapsulating volatile aroma compounds in which an inert gas, such as carbon dioxide, is dissolved in an aromatized edible liquid, and the aromatized, gasified liquid is co-extruded with a molten carbohydrate material having a glass transition temperature of between 20° C. and 80° C. to provide a continuous stream having an outer shell of the carbohydrate material surrounding an inner core of the aromatized, gasified liquid. The continuous stream is extruded into a pressure chamber having a pressure higher than the internal pressure of the inert gas in the aromatized liquid core, and is maintained under such pressure until the carbohydrate shell has cooled to below the glass transition temperature to provide capsules having a shell of hardened amorphous carbohydrate glass surrounding an inner core of gasified, aromatized liquid. When the capsules, which are incorporated in an instant consumer product, are contacted with hot water, the inert gas in the capsule core rapidly expands and ruptures the capsule wall, releasing aromatized liquid across the surface of the water. In accordance with a preferred embodiment, coffee aroma capsules are prepared from 100% coffee derived material, in which coffee aroma frost is dissolved in coffee oil and gasified, and the aromatized, gasified coffee oil is encapsulated in an outer shell of hardened amorphous coffee glass.

17 Claims, 3 Drawing Sheets

ENCAPSULATION OF VOLATILE AROMA COMPOUNDS

This invention relates to a method of encapsulating volatile aromatic substances and to the aroma-containing capsules produced by such method. More particularly, the invention relates to the production of coextruded capsules in which a liquid core material containing volatile aroma compounds is encapsulated within a shell of hardened carbohydrate glass. The coextruded capsules have an extended shelf life with minimal loss and deterioration of the volatile aroma compounds during production and storage. However, upon contact with a hot aqueous medium, the capsules rapidly release a burst of aroma above the surface of the aqueous liquid.

BACKGROUND OF THE INVENTION

In the manufacture of many powdered instant food and beverage products, such as instant coffee and tea, instant soups, instant desserts, and the like, the food or beverage components are subjected to heating during processing, which results in the loss or deterioration of volatile compounds which contribute to the desirable aroma and/or flavor of the product which is reconstituted by the consumer. To compensate for such loss during processing, natural and synthetic aromas and flavors, which consist of various combinations of alcohols, aldehydes, ketones, esters, and the like, typically are added to the finished product in an attempt to provide the product with the desired aroma and/or flavor. However, such natural and synthetic aromas and flavors are highly volatile and extremely sensitive to oxidation by atmospheric oxygen and to moisture. As a result, many of these substances, after incorporation in the food or beverage, lose much of their original aroma and flavor and fail to provide the consumer product with the desired characteristics.

For example, in the production of soluble coffee products ground roasted coffee is typically extracted with an aqueous liquid, with the extract being filtered, concentrated by evaporation and converted into powder form by freeze drying or spray drying. One of the major problems with this type of process is the fact that the powdered product obtained lacks the desired aroma of freshly brewed coffee, since the extraction, concentration and drying steps normally utilized in industrial production of soluble coffee products typically result in loss and degradation of volatile aroma constituents.

It has been recognized that the aroma and flavor of soluble coffee products upon reconstitution with a hot aqueous liquid, can be improved by incorporating in the soluble coffee powder aroma compounds which have been evolved during the coffee processing operation. A number of procedures have been proposed heretofore to incorporate volatile coffee aroma compounds in soluble coffee powders. However, none of these prior procedures has been entirely satisfactory since aromatic coffee substances are extremely volatile and unstable. For example, in one proposed method, an aromatic coffee substance is emulsified in water and the emulsion is dropped into finely ground soluble coffee powder which is vibrated and allowed to stand for an appropriate time to coat the aromatic substances with coffee powder. However, the aromatic substance can not be adequately coated so that substantial amounts of the volatile aroma are lost during storage.

In recent years, a number of procedures have been suggested which utilize coffee glass in connection with natural and synthetic aromas. In such procedures coffee aroma typically is dispersed in an extruded matrix of coffee glass. For example, a coffee concentrate having about 88% to 97% total coffee derived solids, is heated to between about 60° C. to 130° C. to provide a viscous melt. Coffee aroma compounds are dispersed in the hot viscous melt, and the resulting melt is then extruded through a restricted orifice into a sheet. Upon cooling, the viscous melt solidifies to a hard glass having coffee aroma dispersed within the glass matrix. The cooled sheets are broken into pieces of a desired size which usually are incorporated into jars of soluble coffee products. Such prior procedures suffer from the disadvantage that the addition of coffee aroma to the hot, liquefied melt of coffee solids prior to extrusion causes considerable thermal degradation of the coffee aroma, which adversely affects the desired aroma profile in the product. Moreover, unless the aroma-containing coffee glass matrix is broken up into relatively fine particles, the rate of dissolution of the coffee glass in hot water is not sufficiently rapid to provide the desired burst of aroma in the cup. Rather, as the coffee glass particles dissolve, the major portion of the aroma dispersed in the glass matrix, is released relatively slowly, and is dissolved in the water without ever leaving the cup. It has been suggested that the solubility of the coffee glass particles may be improved by gasification of the hot viscous coffee melt prior to extrusion. However, such a gasification procedure has not been entirely successful in releasing aroma constituents in a concentration sufficient to produce an aroma which the consumer can immediately sense as above-cup aroma.

SUMMARY OF THE INVENTION

The present invention provides a method of encapsulating volatile aroma compounds whereby the aroma compounds can be stored for extended periods of time, either alone or in a consumer product, without significant loss or deterioration, but which are readily released upon contact with a hot aqueous liquid to provide a burst of aroma above the surface of the liquid which the consumer can immediately sense as above-cup aroma. The encapsulation method of this invention provides coextruded capsules having a shell of hardened carbohydrate glass, such as coffee glass, surrounding a core of an edible aromatized liquid, with the aromatized liquid core being saturated with an inert gas under pressure. Pressurizing the aromatized liquid core of the capsules by dissolving an inert gas such as carbon dioxide, in the liquid ensures rapid release of aroma constituents when an instant consumer product in which the capsules are incorporated is contacted with a hot aqueous liquid. That is, upon contact with hot aqueous water, such as when a cup of coffee is prepared, inert gas dissolved in the pressurized aromatized liquid core, expands to rupture the walls of the capsule promptly after the capsules are contacted with hot water to release the aromatized liquid which spreads across the surface of the cup. Aroma constituents volatilize from the liquid into the atmosphere above the surface of the water to produce a burst of aroma. Fragments of the capsule will dissolve more slowly (usually within about 2 minutes) in the hot water.

The present invention is particularly applicable, and will be described in regards to, the preparation of coffee aroma capsules, with the capsules having a shell of hardened amorphous coffee glass surrounding a pressurized core of coffee oil in which coffee aroma constituents have been dissolved. This invention enables such coffee aroma capsules to be prepared from 100% coffee derived material, and provides the advantage that during the production of the coextruded capsules the coffee aroma constituents are not subject to temperatures which would result in the thermal degradation of the aroma. It will be understood, however, that the principles of this invention may be used to encapsulate numerous other volatile aroma constituents, including essential oils, for incorporation in a variety of instant consumer products, such as instant soups.

In the production of coffee aroma capsules, the capsules are produced by the coannular extrusion of a molten mixture of coffee solids as the wall material surrounding a core material of an aromatized, pressurized liquid oil. In producing the capsules of the present invention, coffee aroma constituents, typically in the form of cryogenically condensed aroma frost, are dissolved in a liquid oil, preferably coffee oil. Since water is detrimental to the stability of coffee aroma, the oil is processed by any suitable procedure to remove substantially all of the water which may be contained therein. The aromatized oil is contacted with an inert gas, preferably carbon dioxide, under pressure so that the oil is saturated with the inert gas, and the aromatized, gasified oil is forced through the inner nozzle of a coannular extrusion apparatus and forms the liquid inner core portion of the capsules.

The liquid inner core of the capsules is surrounded by an outer wall or shell of hardened carbohydrate glass, preferably coffee glass. The coffee glass shell is preferably formed from a coffee mixture containing about 85% to 97% total coffee solids and about 3% to 15% water, which has a glass transition temperature of between 20° C. to 80° C., preferably between 30° C. to 40° C. The coffee mixture is heated to from 70° C. to 110° C. to form a hot viscous melt which is pumped through the outer die orifice of the coextrusion apparatus at a relatively high pressure such as 3,000 psi (211 kg./sq. cm.) or more. The material exits from the die orifice as a continuous rope or strand of narrow cross-section, having a continuous outer shell of amorphous coffee solids surrounding a coextruded inner core of aromatized, carbonated liquid oil. The continuous rope is cut or pinched into pieces of a desired length, typically from 0.5 to 5 mm, preferably 1 to 2 mm, by any suitable means, to provide capsules in which an inner core of aromatized, gasified liquid is sealed within a shell of carbohydrate glass. Preferably the capsules are contacted with finely divided, edible anti-tacking agents, such as soluble coffee fines, which coat the capsules and prevent them from sticking to each other.

The concentrated coffee solids melt forming the outer shell is at an elevated temperature as it is discharged from the coextrusion apparatus but rapidly cools to effect a phase transition from a viscous liquid to a hard coffee glass, thereby providing the capsules with highly impervious walls which retain at least 80%, preferably 95% or more, of the volatile aroma compounds in the capsules. While the coffee solids melt is at an elevated temperature it is relatively soft and pliable. In order to retain the pressurized inert gas in the liquid oil core until the coffee solids melt forms a hard coffee glass shell, the coextruded product is discharged from the die orifice of the coextrusion apparatus into a chamber which is maintained at a pressure such that the inert gas in the core remains in solution. That is, the coextruded product is extruded into a pressure chamber which is maintained at a pressure higher than the internal pressure generated by the inert gas. Suitably the chamber into which the product is extruded is maintained at a pressure of about 40 psi (2.8 kg./sq. cm.) or higher. Extruding the capsules into such a pressurized chamber is essential in order to retain the inert gas in solution within the oil core. The capsules are retained under such pressure until the capsule wall material rigidities, at which point the coffee glass capsule walls have sufficient tensile strength to retain the pressurized inert gas in solution.

In a preferred embodiment, the continuous coextruded strand leaving the extrusion apparatus is stretched, such as by cutting or pinching the strand with opposed, counter rotating blades which travel faster than the extruded rope leaving the coextrusion die, in order to reduce the diameter of the capsules.

The capsules produced by the process of this invention typically have a length of 0.5 to 5 mm, preferably 1 to 2 mm and a diameter of from 0.5 to 2 mm, preferably 0.75 to 1 mm, with the surface of the capsules being coated by soluble coffee powder. The capsules are dimensioned so that the liquid core occupies from about 30% to 50%, preferably from 35% to 42% of the capsule volume, to provide at least 80% and preferably 95% or more retention of aroma. The capsules maintain their integrity and retention of the encapsulated coffee aroma for over twelve months without any apparent degradation of quality or loss of aroma constituents.

The capsules produced by the present invention are uniformly distributed by any suitable means in jars of soluble coffee powder, such as by simply mixing the capsules with soluble coffee powder. The level of coffee capsule incorporation into soluble coffee may vary within wide limits, typically from 1 to 10%, depending on the size of the capsules themselves and the volume fraction of payload. As a general rule, the smaller the coffee capsules, the greater the amount that may be incorporated in the soluble coffee. When the soluble coffee powder containing the capsules of this invention is reconstituted by the addition of hot water, the carbon dioxide dissolved in the core quickly expands to rupture the hard glass wall of the capsules due to the increase in pressure created by the high temperatures. The aromatized oil is released from the capsules and spreads across the surface of the water, with the coffee aroma volatilizing into the atmosphere above the surface of the water to produce a burst of aroma. Consequently, the release of aroma from the capsules is independent of the rate of dissolution of the coffee glass wall material of the capsules.

DETAILED DESCRIPTION OF THE INVENTION

Figure 1:
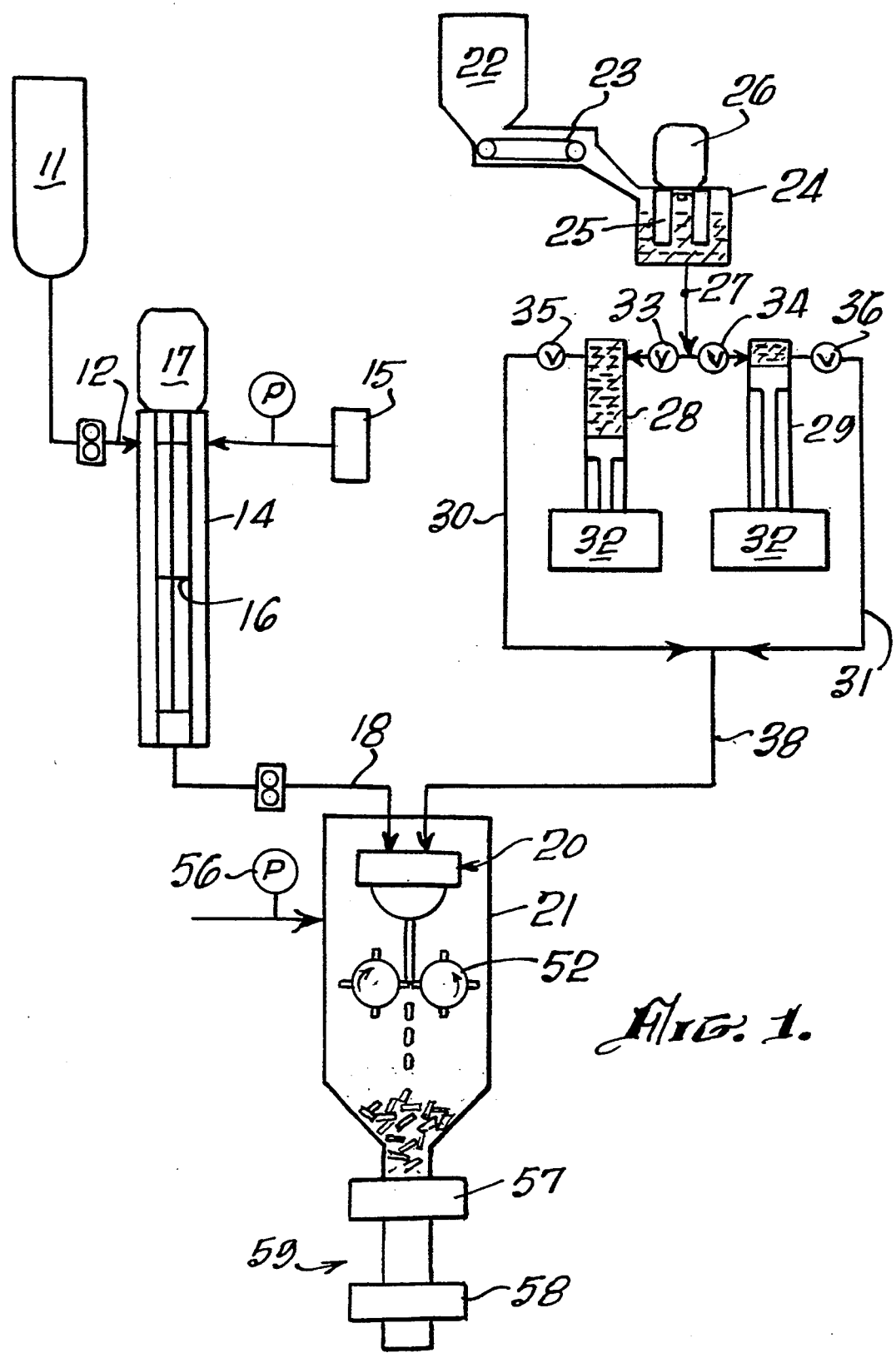
FIG. 1 is a schematic flow sheet illustrating the process of the present invention.

Reference is made to the drawings to describe the method of this invention in more detail in connection with the preparation of coffee aroma capsules. As shown in FIG. 1, an edible aromatized liquid is held in tank 11. This forms the liquid core portion of the coffee aroma capsules produced by the present invention. A wide variety of food grade liquids may be used as the liquid core material as long as the liquid is not a solvent for the capsule wall material used, and is compatible with the specific end use intended for the capsules. Capsule core materials which may be used include edible oils having a melting point in the range of from about $-18°$ C. to about $50°$ C., such as safflower oil, peanut oil, cotton seed oil, corn oil, coffee oil, olive oil, soybean oil, sesame oil, and oils derived from other vegetable sources, as well as essential oils, such as lemon oil, lime oil, orange oil, and the like. Medium chain triglycerides, composed of fatty acids having from 6 to 12 carbon atoms may also be used as the liquid core material as well as a blend of oil with a water soluble food grade solvent, such as triethyl citrate, triacetin, glycerol, ethanol, fatty acids and the like. The selection of a particular edible liquid core material will generally be dictated by the specific end use intended for the capsules. In preparing coffee aroma capsules, preferably the liquid core material is coffee oil, for its use enables the production of capsules based entirely on coffee and coffee derivatives. The edible liquid core material, e.g., coffee oil, is aromatized by any suitable means, such as by injecting volatile aroma constituents, preferably coffee aroma gas, into the oil with agitation. Coffee aroma gases used may be evolved at any of several points in the processing of coffee, such as, for example, gases evolved during roasting of green coffee ("roaster gases"), gases evolved during grinding of roasted whole beans ("grinder gases") and those evolved during infusion of ground roasted coffee ("infusion gases"). Preferably, the coffee aroma constituents are in the form of cryogenically condensed aroma gas frost, which is dissolved in the oil with the ratio by weight of oil to aroma frost in the aromatized liquid being greater than 0.5, and preferably between 0.65 and 0.9. A preferred procedure for aromatizing coffee with coffee aroma frost is described in connection with FIG. 3.

A variety of volatile aroma compounds, other than coffee aroma, may be used in the present invention. For example, natural and/or artificial aroma constituents of meat, seafood, fruits, vegetables, spices, etc. may be used in the present invention in aromatizing the liquid core material, such as by dissolving or emulsifying the aromatic constituent in the liquid core material. In addition, the volatile aroma constituents may inherently be present in the liquid core material, such as when essential oils (e.g., lemon oil, orange oil, lime oil, etc.) are used as the core material, so that the addition of separate aromatic constituents to the liquid core material is not essential. The selection of a specific aroma compound will, of course, depend on the specific end use intended for the capsules.

Referring to FIG. 1 aromatized oil, such as aromatized coffee oil, is pumped from tank 11 through line 12 into pressure column 14 in which an inert gas, preferably carbon dioxide, is dissolved in the oil. Thus, carbon dioxide gas from a suitable source 15 is injected into the oil in column 14 and uniformly blended with the oil under agitation, such as by means of wiping blades 16 driven by motor 17. The extent of carbonation of the oil is dependent largely on the temperature and pressure conditions in column 14 which may be in the range of about $10°-50°$ C. at pressures of between about 10 to 40 psi (0.70 to 2.8 kg./sq. cm.). In producing the capsules of the present invention, the oil is carbonated under conditions such that the amount of carbon dioxide in the oil is sufficient to rupture the amorphous coffee glass capsule wall when the capsules are contacted with hot water (above about $60°$ C.), but is insufficient to rupture the capsules at room temperature once the coffee glass walls have rigidified. For example, when coffee oil is carbonated at 22 psi (1.5 kg./sq. cm.), for each gram of oil carbonated, 5.5 cc of gas, an amount sufficient to rupture the capsule walls, will be evolved when capsules are contacted with hot water.

The aromatized, carbonated oil is pumped under high pressure from column 14, via line 18, to coextrusion die assemble 20 mounted within pressure chamber 21, from which the aromatized, carbonated oil is extruded from die orifices in the coextrusion die assembly as the liquid core within the capsules of the present invention.

In order to provide capsules having a hardened, continuous, impervious shell, an edible carbohydrate material which has a glass transition temperature of between about $20°$ C. to $80°$ C. to form a rigid carbohydrate glass upon cooling from a molten state is used as the wall material. Suitable wall materials include coffee solids, tea solids, corn syrup solids, maltodextrin, corn dextrin, and the like. The wall material is heated to a temperature above the glass transition temperature to liquefy the material and form a viscous melt which upon cooling to ambient temperatures forms a hard, stable, impermeable glass. In the production of coffee aroma capsules, the wall or shell portion of the capsules preferably is formed from a homogeneous coffee mixture having a high level of coffee solids, that is, from 85% to 97% by weight preferably 87% to 94% coffee solids by weight and between about 3% to 15% by weight water, preferably between 6% to 13% by weight water respectively. Such a mixture of coffee solids has a glass transition temperature of between $20°$ C. and $80°$ C., typically between $30°$ C. to $40°$ C. so that when the high solids coffee mixture is heated to form a hot melt and then cooled, there is obtained a hard, rigid, brittle amorphous coffee glass.

Such a high solids coffee mixture can be prepared from coffee extract obtained by normal infusion by concentrating the extract such as by falling film evaporation followed by scraped surface evaporation or other suitable procedures to obtain a solids content of at least 85%, preferably at least 87%. The coffee mixture can also be obtained by mixing dried coffee solids, spray dried, freeze dried or otherwise, with sufficient water or coffee extract to provide a mixture having a moisture content of between 3% and 15%, preferably between 6% and 13%.

As illustrated in FIG. 1, dried soluble coffee solids is stored in hopper 22 from which weighed quantities of the coffee solids are transferred on endless belt 23, mounted adjacent an opening in the base of hopper 22, to heating/mixing tank 24. Sufficient water is added to the tank to form a coffee solids mixture having a total coffee solids concentration of from 85% to 97%, preferably 87% to 94%, and a water content of from 3% to 15%, preferably 6% to 13%. The coffee solids mixture in tank 24 is heated to a temperature sufficient to form molten coffee solids, usually between about $70°$ C. to $110°$ C. preferably $95°$ C. to $105°$ C. which are agitated by means of paddles 25 driven by motor 26 to provide a homogeneous viscous coffee melt. The coffee solids may be heated by any suitable means such as, for example, a steam jacket surrounding tank 24, steam injection, heating coils, radiant heat, and the like.

The hot viscous coffee melt is pumped from tank 24, through line 27 to a pair of linear drive piston pumps 28, 29 which operably communicate with conduits 30, 31, respectively. Each piston pump 28, 29 includes a tubular sleeve, a reciprocal piston within the sleeve and a piston rod secured to piston assembly 32. Inlet valves 33, 34 control the flow of molten coffee solids into pumps 28, 29 respectively, and discharge valves 35, 36 control the flow of the viscous coffee melt from pumps 28, 29 to conduit 38. As illustrated in FIG. 1, piston pump 28 is in the retracted position and piston pump 29 is in the forward moving position having previously received a charge of molten coffee solids from tank 24. During this sequence, inlet valve 34 is closed and discharge valve 36 is open so as to define an open flow path for the molten coffee solids through lines 31, 38 into coextrusion unit 20. During the retraction of piston 28, inlet valve 33 is open to enable a charge of molten coffee solids to be delivered to pump 29. In this manner reciprocal pumps 28, 29 operate in a batch-continuous manner so as to continuously feed a stream of molten coffee solids to coextrusion die assembly 20.

Figure 2:
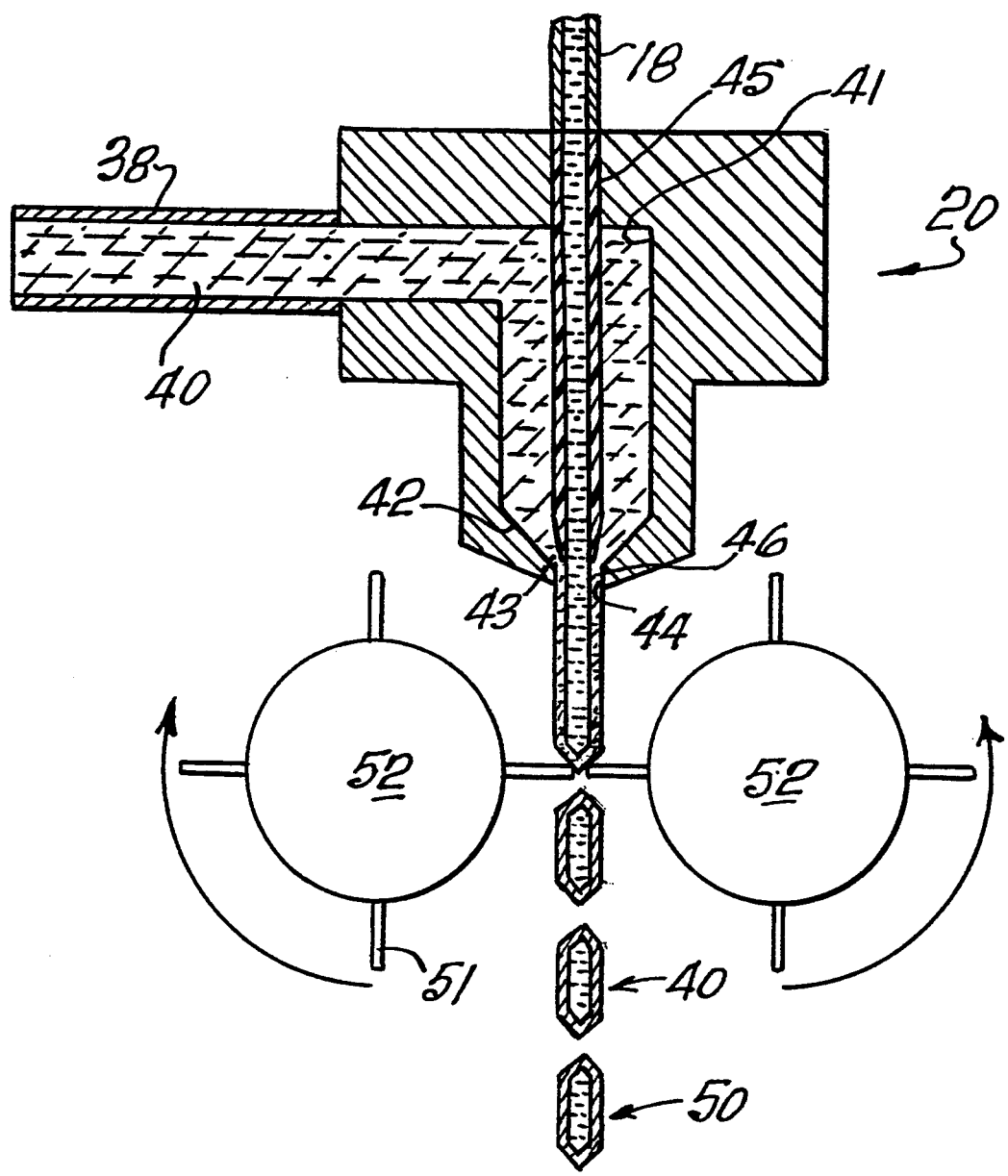
FIG. 2 is an enlarged cross-sectional view of the coextrusion apparatus for producing the capsules of this invention.

Coextrusion die assembly 20 is illustrated in more detail in FIG. 2. As shown therein, the die assembly 20 has a cylindrical chamber 41 adapted to receive molten coffee solids 40 from conduit 38. Cylindrical chamber 41 has an inwardly tapering bottom wall 42 which terminates in a cylindrical opening 43 extending therethrough to define a die orifice 44, having a diameter of from about 0.5 to 2.5 mm, in the outer face of the die assembly. Conduit 45 which is adapted to receive aromatized, carbonated oil from line 18 is mounted concentrically within chamber 41 with the downstream end of conduit 45, which terminates above cylindrical opening 43, having a frustoconical outer face. The frustoconical downstream end of conduit 45 is spaced from the inwardly tapering bottom wall 42 of chamber 41 to define an annular extrusion passage 46 therebetween through which the coffee solids melt 40 is extruded in the form of a continuous tubular shell from die orifice 44. Aromatized, carbonated oil is pumped through the longitudinal passage extending through conduit 45 and is discharged from die orifice 44 as a pressurized liquid core within the tubular shell of molten amorphous coffee glass. The frustoconical outer face of conduit 45 and the tapering bottom wall 42 of chamber 41 are spaced from one another sufficiently to deliver the coffee solids melt under suitable extrusion pressure and rate concomitant with the extrusion pressure and rate of delivery of the liquid core discharged from conduit 45, and to provide an extruded outer shell having the desired thickness. Thus, molten coffee solids and the aromatized, gasified coffee oil are coextruded from die assembly 20 as a continuous stream of narrow cross-section with an outside diameter of between 0.5 to 2.5 mm., and having a continuous outer shell of coffee solids melt surrounding an inner core of aromatized, gasified coffee oil.

The continuous tubular extrudate is pinched into pieces of predetermined length, typically from 1 to 5 mm, and preferably from 1.5 to 3 mm, by any suitable means, such as by blades 51 carried on a pair of opposed counterrotating rollers 52 mounted beneath die orifice 44. Preferably rollers 52 are positioned a suitable distance apart to provide for the transverse subdivision of the continuous tubular extrudate into individual capsules of desired length. For example, the coffee solids outer shell portion of the tubular extrudate is warm and relatively soft and in a plastic state as it is extruded from the die orifice. As the tubular extrudate passes between the opposed rollers 52, blades 51 pinch together the wall of the tubular extrudate to seal the end of the tubular extrudate and sever the end portion of the tube into pieces of predetermined length. The speed of the rollers 52 may be so regulated that the blades 51 have approximately the same peripheral speed as the speed at which the tubular extrudate moves downwardly from the die orifice. In accordance with a preferred embodiment, the speed of the rollers 52 is adjusted so that the blades 51 have a faster peripheral speed than the rate at which the tubular extrudate exits from the die orifice 44, to thereby stretch the tubular extrudate and reduce its diameter prior to forming discrete capsules, thereby producing thinner capsules.

The coffee solids, which form the outer shell of the capsules, have been heated to a temperature of between about 70° C. to 110° C. to form the viscous melt which is extruded, with the coffee solids melt being at an elevated temperature when extruded through die orifice 44. As noted above, the coffee solids shell, upon extrusion from the die orifice, is at a temperature above the glass transition temperature and is in a plastic condition, being relatively soft and pliable. As extruded, the coffee solids melt lacks sufficient strength to retain the carbon dioxide in solution in the oil core at the temperatures involved in extrusion. However, upon cooling to below the glass transition temperature, the coffee solids form hard amorphous coffee glass which has a sufficient strength to retain the carbon dioxide in solution in the oil during storage and handling. In accordance with the present invention, an external pressure is applied to the continuous tubular extrudate as it is extruded from the die assembly and severed into individual capsules, and the capsules retained under such pressure until the capsule wall rigidities. That is, the continuous tubular extrudate is extruded from die assembly 20 into pressure chamber 21 and the tubular extrudate is formed into sealed capsules within the pressure chamber, with the capsules being retained in chamber 21 until the coffee solids capsule wall has cooled sufficiently to undergo transition to a hard, glass state. Chamber 21 is maintained under elevated pressure by means of pump 56 delivering air or other gas under pressure into the chamber, with chamber 21 being maintained at a pressure greater than the internal pressure generated by the carbon dioxide in the liquid core material at extrusion temperatures. That is, the pressure chamber is maintained at a pressure greater than about 40 psi (2.8 kg./sq. cm.). When cooled to room temperature the coffee solids solidify to form hard, amorphous coffee glass having a tensile strength in excess of about 200 psi/in$^2$, which is sufficient to retain the carbon dioxide in solution in the liquid oil core during storage and handling.

In accordance with a preferred embodiment an agitated bed of soluble coffee fines or other finely divided, edible anti-tacking agents, is maintained at the base of chamber 21 to coat the extruded capsules and prevent their sticking together, with the fines being introduced into the chamber through a conventional air lock (not shown) in the sidewall of the chamber. A second conventional air lock 59, controlled by upper and lower valves 57, 58 is mounted at the base of pressure chamber 21 for removal of capsules from the pressure tank, once the capsules have cooled and rigidified.

The capsules produced by the method of the present invention, as described hereinabove, have a hard shell of amorphous coffee glass surrounding an inner core of aromatized, carbonated coffee oil. Maximum retention of aroma in the capsules is provided by control of the geometry of the capsules. That is, dimensioning the capsules so that the liquid core occupies form 30% to 50% of the capsule volume will provide at least 80% aroma retention in the core after 6 months storage. Maximum retention of aroma, that is, 95% or more after 6–12 months of storage can be obtained when the capsules are dimensioned so that the liquid core occupies 35% to 42% of the capsule volume.

Figure 3:
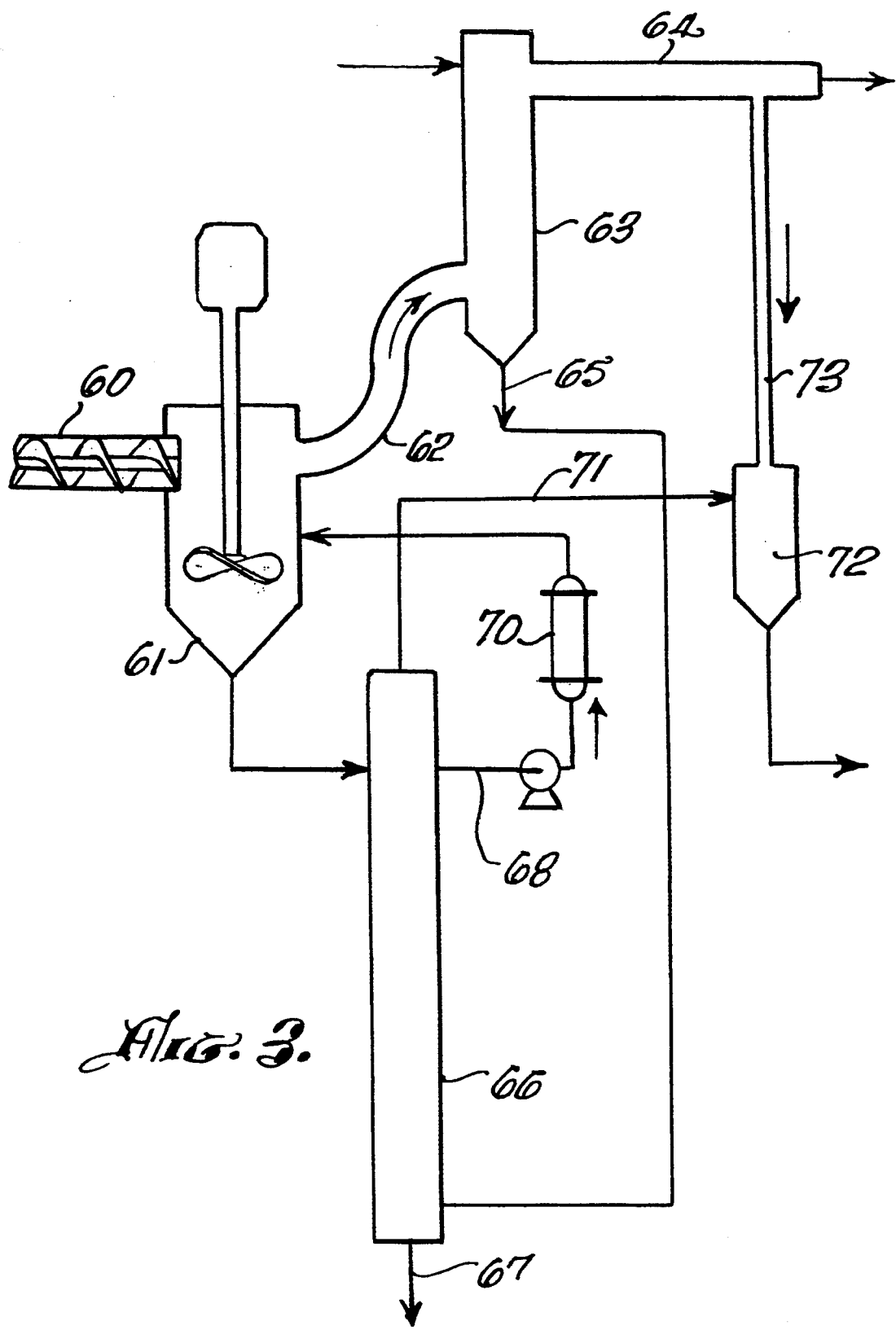
FIG. 3 is a schematic flow chart depicting one embodiment for aromatizing a liquid oil used as the core in the capsules of this invention.

In accordance with a preferred embodiment of the invention, liquid oil used as the core material of the capsules, is aromatized in accordance with the procedure illustrated in FIG. 3, which is adapted to remove substantially all of the water which may be present in the oil. As shown therein, cryogenically condensed coffee aroma frost, which consists largely of carbon dioxide together with water vapor and the characteristic aromatic constituents of roasted coffee, is carried by auger screw 60 into frost melt tank 61 containing agitated oil, preferably coffee oil, under conditions such that the aroma frost sublimes/melts resulting in the production of a gas phase comprising carbon dioxide and aroma constituents, and a liquid phase comprising a mixture of oil, water and aroma constituents. The gas phase generated by the subliming frost is carried from the frost melt tank in line 62 to packed scrubbing column 63. Fresh coffee oil is introduced into the upper end of column 63 from conduit 74 and descends through the column removing oil soluble aroma constituents from the gas, with the aroma-depleted gas being vented through line 64. The oil, which contains aroma constituents removed from the sublimated gas, is carried from scrubbing column 63 in line 65 to the base of liquid/liquid extraction column 66, in which the oil ascends the column counter current to a descending flow of the liquid phase oil-water-aroma mix removed from the base of tank 61. As the liquid phase descends extraction column 66 those components with significant oil solubility are scrubbed out of the liquid phase into the ascending oil. The oil insoluble components, primarily water, of the liquid phase are removed from the base of column 66 through lines 67 and discarded.

At the upper end of extraction column 66, a portion of the aromatized oil is removed through line 68 and mildly heated by passage through conventional heating means 70 and recycled back to frost melt tank 61. At the top of extraction column 66, substantially water free aromatized oil is carried via line 71 to a surge tank 72. The surge tank preferably is blanketed by gas vented from scrubbing column 63 via line 73, to reduce the potential for oxygen damage to the aromatized oil. From the surge tank, the oil may be pumped to a centrifuge (not shown) to remove the last traces of water. The aromatized oil is then pumped to agitated column 14 in which it is carbonated, as shown in FIG. 1.

The following example is provided to further illustrate, not to limit, the invention. All parts and percentages are by weight unless otherwise indicated.

EXAMPLE

A premeasured amount of soluble coffee powder is mixed with sufficient water to produce a thick, viscous coffee paste having a coffee solids content of 92% by weight. The coffee paste is heated to about 90° C. and is pumped at a pressure of about 2,770 psi (195 kg./sq. cm.) by means of an ISCO 500D syringe to the coextrusion die assembly illustrated in FIG. 2. The hot viscous coffee paste is extruded as a continuous tubular shell from a die orifice having a diameter of 0.078 in. (1.98 mm) at a rate of 6 ml/min., with the continuous tubular shell being extruded into a pressure chamber that is maintained at a pressure of 50 psi (3.5 kg./sq. cm.) by using carbon dioxide gas. The chamber is maintained at a temperature of between about 20° C. to 30° C.

Aromatized coffee oil is carbonated by injecting carbon dioxide gas at a pressure of 25 psi (1.8 Kg/Sq. cm.) into the oil, with agitation. The aromatized, carbonated oil is pumped with the aid of a piston pump to the coextrusion die assembly and is extruded through a tube having an inside diameter of about 0.019 in. (0.48 mm.) mounted in the die assembly above the die orifice through which the tubular shell is extruded. The aromatized, carbonated oil is coextruded through the die orifice at a rate of 4 mi./min. as a liquid core in the continuous tubular shell.

The continuous tubular shell which surrounds the liquid carbonated oil core is pinched between opposing rollers to form discrete, sealed capsules having a length of about 3 mm and a diameter of about 1 mm. The capsules are retained in the pressure chamber for about 80 minutes at which time the capsules are at about ambient temperature and are removed from the pressure chamber. The resulting capsules have a hard amorphous coffee glass shell surrounding an inner liquid core of aromatized carbonated coffee oil. When the capsules are dropped into a cup of hot water (above about 60° C.) the coffee glass shell of the capsules immediately ruptures (e.g. within about 10 seconds) due to the increase in pressure resulting from the high temperatures. The aromatized oil is released and spreads across the surface of the water. At the surface, the aromatic constituents volatilize into the atmosphere above the cup and produce a burst of aroma. The fragments of the amorphous coffee glass shell sink to the bottom of the cup where they slowly dissolve, typically within about two minutes.

By way of comparison, capsules which are produced by the same procedure, with the sole exception that the aromatized oil is not carbonated or otherwise pressurized, when added to a cup of hot water (above about 60° C.) do not immediately rupture. Rather, the intact capsules sink to the bottom of the cup and after about 2 minutes the amorphous glass wall material dissolves and the oil core rises to the surface of the water.

The capsules produced by the present invention may be incorporated in a variety of consumer products. For example, capsules comprising a hardened shell of amorphous coffee solids surrounding a pressurized liquid core of coffee oil containing coffee aroma constituents, may simply be mixed with soluble coffee powder, with the amount of coffee aroma capsules incorporated in the soluble coffee powder varying from about 1% to 10% by weight of the soluble coffee. Capsules containing volatile aroma compounds may also be included in a variety of instant food products. For example, capsules containing the aroma constituents of vegetables and/or beef in a liquid oil core surrounded by a shell of hardened carbohydrate glass formed of corn syrup solids, may be used in the preparation of instant soup products in amounts of from about 0.2 to 5% by weight of the instant product.

Generally the amount of aroma capsules added to a consumer product can vary from as little as 0.01% to as much as 10% by weight. The amount of aroma capsules which is added to a particular product is generally dependent on the desired level of aroma that is to be imparted to the food or beverage product and the aroma strength of the particular capsules.

What is claimed is:

1. A method of encapsulating volatile aroma constituents which comprises contacting an aromatized edible liquid with an inert gas under conditions to dissolve the gas in said liquid, introducing the aromatized, gasified liquid into a coextrusion zone together with a molten edible carbohydrate material which forms a rigid carbohydrate glass upon cooling from a molten state, coextruding said molten carbohydrate material and said aromatized liquid from said coextrusion zone in the form of a continuous stream of narrow cross-section having a continuous outer shell of said carbohydrate material surrounding an inner core of aromatized gasified liquid, with said continuous stream being extruded into a pressure zone having a pressure higher than the internal pressure of the inert gas in the aromatized liquid core, transversely subdividing the coextruded stream into sealed capsules of predetermined length, and retaining the coextruded material in said pressure zone until the carbohydrate material has cooled to form a rigid carbohydrate glass to provide capsules having a shell of hardened amorphous carbohydrate glass surrounding an inner core of gasified aromatized liquid.

2. The method defined in claim 1 in which the molten carbohydrate material is a molten coffee solids mixture containing from 85% to 97% by weight coffee solids and from 3% to 15% by weight water, with the molten material having a temperature of between about 70° C. to 110° C.

3. The method defined in claim 2 in which the molten coffee solids mixture is obtained by combining dried soluble coffee solids with sufficient water to form a coffee mixture having a total coffee solids content of from 85% to 97%, and heating said mixture to a temperature sufficient to liquefy said coffee solids mixture.

4. The method defined in claim 2 in which the aromatized liquid comprises coffee oil having coffee aroma constituents dissolved therein, and an inert gas is injected into the aromatized oil under pressure to dissolve the inert gas in the oil and thereby provide aromatized, gasified coffee oil.

5. The method defined in claim 4 in which the inert gas is carbon dioxide which is injected into the aromatized coffee oil under conditions sufficient to saturate the oil with carbon dioxide.

6. The method defined in claim 1 in which the continuous stream of coextruded material is transversely subdivided into closed capsules in said pressure zone before the carbohydrate outer shell has cooled sufficiently to form hard carbohydrate glass.

7. The method defined in claim 5 in which said pressure zone is a closed pressure chamber which is maintained at a pressure of at least about 40 psi (2.8 kg./sq. cm.).

8. The method defined in claim 6 in which the capsules are dimensioned so that the liquid oil core occupies from about 30% to 50% of the capsule volume.

9. The method defined in claim 1 in which the carbohydrate material has a glass transition temperature of between about 20° C. and 80° C.

10. The method defined in claim 5 in which carbon dioxide is injected into the aromatized coffee oil at a pressure of about 10 to 40 psi (0.70 to 2.8 kg./sq. cm.) and a temperature of from 10° C. to 50° C.

11. The method defined in claim 10 in which the amount of carbon dioxide dissolved in the coffee oil is sufficient to release at least 5.5 cc of gaseous carbon dioxide per gram of encapsulated coffee oil when the capsules are contacted with water having a temperature above about 60° C.

12. The method defined in claim 4 in which aromatized oil substantially free of water is produced by adding cryogenically condensed coffee aroma frost particles to coffee oil under conditions such that the coffee aroma frost particles sublime and/or melt to form a gas phase containing volatile oil soluble aromatic constituents dispersed in carbon dioxide, and a liquid phase containing coffee oil, water and aromatic constituents, scrubbing the gas phase with coffee oil whereby oil soluble aromatic constituents are removed from the gas phase into the coffee oil to form an oil phase enriched in aromatic constituents, passing said oil phase in counter current contact with said liquid phase, whereby the coffee oil and aromatic constituents of said liquid phase are extracted into said oil phase with the water content of the liquid phase being substantially separated from the aromatized oil phase to thereby provide aromatized coffee oil substantially free of water.

13. The method defined in claim 5 in which a molten mixture of coffee solids having a glass transition temperature of about 20° C. to 80° C. is coextruded as a continuous rope having a shell of molten coffee solids surrounding a liquid core of aromatized coffee oil which is pressurized by carbon dioxide dissolved in the coffee oil, with the continuous rope being coextruded into a pressure zone having a pressure of at least about 40 psi (2.8 kg./sq. cm.), and maintained at such pressure until the molten mixture of coffee solids undergoes phase transition to hard amorphous coffee glass encapsulating the aromatized, carbonated liquid oil core.

14. The method defined in claim 13 in which the molten coffee solids and aromatized, carbonated coffee oil are coextruded through a die orifice having a diameter of from 0.5 to 2 mm, and the continuous coextruded rope is formed into distinct sealed capsules having a length of between 0.5 to 5 mm prior to phase transition of the molten mixture of coffee solids.

15. The method defined in claim 1 in which the aromatized edible liquid is selected from the group consisting of coffee oil, vegetable oils having a melting point in the range of about −18° C. to about 50° C., and essential oils.

16. The method defined in claim 1 in which the edible carbohydrate material is selected from the group consisting of coffee solids, tea solids, corn syrup solids, maltodextrin, corn dextrin, and mixtures thereof.

17. The method defined in claim 6 in which the continuous coextruded stream is stretched to reduce the cross-sectional diameter of the stream prior to subdividing the stream into capsules.

* * * * *